(12) United States Patent
Bishop, Jr. et al.

(10) Patent No.: US 7,752,293 B1
(45) Date of Patent: Jul. 6, 2010

(54) COMMAND PROCESSING IN A TELECOMMUNICATIONS NETWORK

(75) Inventors: Eddie E. Bishop, Jr., McKinney, TX (US); Gerald F. Vander Voord, Plano, TX (US); Alfred J. Blanchard, Plano, TX (US); Charles M. Homola, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 2189 days.

(21) Appl. No.: 10/209,482

(22) Filed: Jul. 30, 2002

(51) Int. Cl.
*G06F 15/173* (2006.01)

(52) U.S. Cl. .................................................. 709/223

(58) Field of Classification Search ................. 709/223, 709/246; 715/234
See application file for complete search history.

(56) References Cited

U.S. PATENT DOCUMENTS

| | | | |
|---|---|---|---|
| 4,648,062 A | 3/1987 | Johnson et al. | |
| 6,008,805 A * | 12/1999 | Land et al. | 715/744 |
| 6,041,350 A | 3/2000 | Takimoto | |
| 6,088,749 A * | 7/2000 | Hebert et al. | 710/105 |
| 6,119,187 A * | 9/2000 | Hebert | 710/105 |
| 6,134,618 A * | 10/2000 | Hebert | 710/105 |
| 6,311,238 B1 * | 10/2001 | Hebert | 710/65 |
| 6,487,590 B1 | 11/2002 | Foley et al. | 709/223 |
| 6,732,153 B1 * | 5/2004 | Jakobson et al. | 709/206 |
| 6,732,167 B1 * | 5/2004 | Swartz et al. | 709/223 |
| 6,813,278 B1 * | 11/2004 | Swartz et al. | 370/466 |
| 6,862,736 B2 * | 3/2005 | Hudis et al. | 719/316 |
| 6,941,556 B1 | 9/2005 | Kessler et al. | 719/316 |
| 6,951,021 B1 | 9/2005 | Bodwell et al. | 719/316 |
| 6,959,329 B2 * | 10/2005 | Thakor | 709/220 |
| 6,961,778 B2 * | 11/2005 | Swartz et al. | 709/230 |
| 6,999,956 B2 * | 2/2006 | Mullins | 707/2 |
| 7,027,975 B1 | 4/2006 | Pazandak et al. | 704/9 |
| 7,039,919 B1 | 5/2006 | Hunt | 719/316 |
| 7,054,924 B1 * | 5/2006 | Harvey et al. | 709/220 |
| 7,065,562 B2 * | 6/2006 | Courtney | 709/220 |

(Continued)

FOREIGN PATENT DOCUMENTS

| EP | 1 077 405 A2 | 2/2001 |
|---|---|---|
| EP | 1 197 859 A1 | 4/2002 |

OTHER PUBLICATIONS

Pending U.S. Appl. No. 10/209,124, entitled *"Requesting Command Processing Using an Interface Servant in a Telecommunications Network,"* by Alfred J. Blanchard, et al., 29 total pages, Jul. 30, 2002.

(Continued)

*Primary Examiner*—J Bret Dennison
(74) *Attorney, Agent, or Firm*—Baker Botts L.L.P.

(57) ABSTRACT

Command processing includes providing a managed object corresponding to a command. The command is associated with a noun and a verb, where the noun represents an item and the verb represents an action to perform on the item. The managed object describes generation of a request for the command. A request for the command generated in accordance to the managed object is received. The request includes a noun value corresponding to the noun and a verb value corresponding to the verb. A reply is determined in response to the request and is transmitted.

19 Claims, 2 Drawing Sheets

U.S. PATENT DOCUMENTS

| | | | | |
|---|---|---|---|---|
| 7,082,464 | B2* | 7/2006 | Hasan et al. | 709/223 |
| 7,149,730 | B2* | 12/2006 | Mullins et al. | 707/2 |
| 7,188,336 | B2* | 3/2007 | Humphries | 717/123 |
| 7,260,777 | B2* | 8/2007 | Fitzsimons et al. | 715/255 |
| 2002/0069275 | A1* | 6/2002 | Tindal | 709/223 |
| 2002/0073078 | A1 | 6/2002 | Ku et al. | 707/3 |
| 2002/0073236 | A1 | 6/2002 | Helgeson et al. | |
| 2002/0091702 | A1* | 7/2002 | Mullins | 707/100 |
| 2002/0099738 | A1 | 7/2002 | Grant | |
| 2002/0103818 | A1 | 8/2002 | Amberden | 707/205 |
| 2002/0107999 | A1 | 8/2002 | Zimmermann et al. | 709/330 |
| 2002/0196281 | A1 | 12/2002 | Audleman et al. | 345/762 |
| 2002/0198974 | A1* | 12/2002 | Shafer | 709/223 |
| 2003/0074463 | A1* | 4/2003 | Swartz et al. | 709/230 |
| 2003/0115299 | A1* | 6/2003 | Froyd et al. | 709/220 |
| 2003/0182282 | A1* | 9/2003 | Ripley | 707/5 |
| 2003/0204481 | A1* | 10/2003 | Lau | 707/1 |
| 2003/0208505 | A1* | 11/2003 | Mullins et al. | 707/102 |
| 2003/0220986 | A1* | 11/2003 | Thakor | 709/220 |
| 2003/0225782 | A1* | 12/2003 | MucFaden et al. | 707/102 |
| 2004/0015889 | A1* | 1/2004 | Todd et al. | 717/137 |
| 2004/0030421 | A1* | 2/2004 | Haley | 700/49 |
| 2004/0040016 | A1* | 2/2004 | Pearce et al. | 717/141 |
| 2004/0117452 | A1* | 6/2004 | Lee et al. | 709/208 |
| 2004/0201600 | A1* | 10/2004 | Kakivaya et al. | 345/700 |
| 2005/0021713 | A1* | 1/2005 | Dugan et al. | 709/223 |
| 2005/0076111 | A1* | 4/2005 | Cherkasova et al. | 709/224 |
| 2005/0193109 | A1* | 9/2005 | Hudis et al. | 709/223 |
| 2005/0265342 | A1* | 12/2005 | Thakor | 370/389 |
| 2006/0015603 | A1* | 1/2006 | Jakobson et al. | 709/223 |
| 2007/0055647 | A1* | 3/2007 | Mullins et al. | 707/2 |
| 2007/0110043 | A1* | 5/2007 | Girard | 370/352 |

OTHER PUBLICATIONS

Speaker, Lisa A., "*A Toolkit for Developing TMN Manager/Agent Applications*", XP 000631666, Hewlett-Packard Journal, pp. 52-61, Oct. 1996.

PCT International Search Report for International Application No. PCT US03/23496, 7 pages, Dec. 16, 2003.

"An XML-Based Component Model for Wrapping Legacy Codes as Java/COBRA Components," High Performance Computing in the Asia-Pacific Region, 2000; Proceedings; The Fourth International Conference/Exhibition on; vol. 1, published 2000; pp. 507-512; by Li et al., 2000.

"Object-Oriented Client/Server Internet Environments," Prentice Hall PTR; pp. 120-121, 301-329; 1997; by Amjad Umar, 1997.

"Client/Server Programming with Java and CORBA," second edition, Wiley Computer Publishing, John Wiley & Sons, Inc., p. 135-152, 417-432; 1998.

"The Common Object Request Broker: Architecture and Specification," Revision 2.0, Jul. 1995, Updated Jul. 1996; pp. 2-1 to 2-18 and 6-1 and 6-52.

USPTO Office Action; U.S. Appl. No. 10/209,124, filed Jul. 30, 2002; Inventor: Blanchard, May 4, 2005.

USPTO Office Action; U.S. Appl. No. 10/209,124, filed Jul. 30, 2002; Inventor: Blanchard, Nov. 21, 2005.

USPTO Advisory Action; U.S. Appl. No. 10/209,124, filed Jul. 30, 2002; Inventor: Blanchard, Feb. 15, 2006.

USPTO Office Action; U.S. Appl. No. 10/209,124, filed Jul. 30, 2002; Inventor: Blanchard, Jun. 7, 2006.

USPTO Office Action; U.S. Appl. No. 10/209,124, filed Jul. 30, 2002; Inventor: Blanchard, Nov. 13, 2006.

USPTO Office Action; U.S. Appl. No. 10/209,124, filed Jul. 30, 2002; Inventor: Blanchard, May 3, 2007.

USPTO Advisory Action; U.S. Appl. No. 10/209,124, filed Jul. 30, 2002; Inventor: Blanchard, Jul. 12, 2007.

USPTO Office Action; U.S. Appl. No. 10/209,124, filed Jul. 30, 2002; Inventor: Blanchard, Oct. 10, 2007.

USPTO Office Action; U.S. Appl. No. 10/209,124, filed Jul. 30, 2002; Inventor: Blanchard, Mar. 26, 2008.

USPTO Advisory Action; U.S. Appl. No. 10/209,124; filed Jul. 30, 2002; Inventor: Blanchard, Jun. 2, 2008.

USPTO Interview Summary; U.S. Appl. No. 10/209,124, filed Jul. 30, 2002; Inventor: Blanchard, Jul. 9, 2008.

USPTO Office Action; U.S. Appl. No. 10/209,124, filed Jul. 30, 2002; Inventor: Blanchard, Sep. 29, 2008.

USPTO Office Action; U.S. Appl. No. 10/209,124, filed Jul. 30, 2002; Inventor: Blanchard, Apr. 22, 2009.

\* cited by examiner

COMMAND PROCESSING IN A TELECOMMUNICATIONS NETWORK

TECHNICAL FIELD OF THE INVENTION

This invention relates generally to the field of telecommunications and more specifically to command processing in a telecommunications network.

BACKGROUND OF THE INVENTION

Command processing is used to handle command requests within a system. Typically, command processing is associated with specific software applications. Such command processing, however, must be replaced or modified for use with different software applications. Consequently, previous techniques for command processing are unsatisfactory for some needs.

SUMMARY OF THE INVENTION

In accordance with the present invention, disadvantages and problems associated with previous techniques for command processing in a telecommunications network may be reduced or eliminated.

According to one embodiment of the present invention, command processing includes providing a managed object corresponding to a command. The command is associated with a noun and a verb, where the noun represents an item and the verb represents an action to perform on the item. The managed object describes generation of a request for the command. A request for the command generated in accordance to the managed object is received. The request includes a noun value corresponding to the noun and a verb value corresponding to the verb. A reply is determined in response to the request and is transmitted.

Certain embodiments of the invention may provide one or more technical advantages. A technical advantage of one embodiment may include a command processing infrastructure that provides a managed object schema that describes a command. A request may use the managed object schema to formulate a request for the command. By providing the managed object schema to the requestor, the command processing infrastructure may be used with any of a number of software applications. Another technical advantage of one embodiment may include an interface servant that has an interface definition language. The interface definition language allows any of a number of systems to request a command definition.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
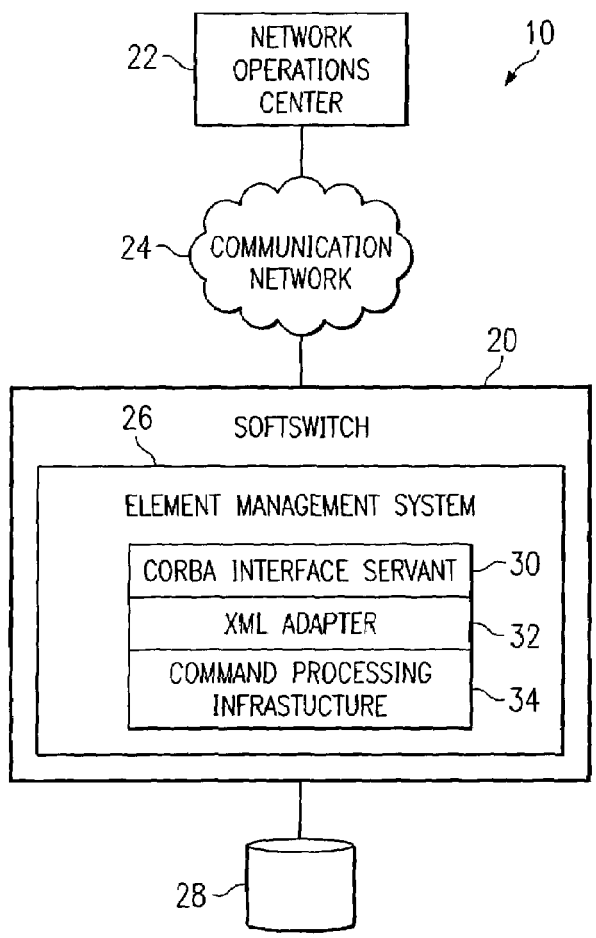
FIG. 1 is a block diagram of one embodiment of a system for processing commands.

FIG. 1 is a block diagram of one embodiment of a system 10 for processing commands. In general, system 10 includes a softswitch 20 with a generic infrastructure that processes requests received from a network operations center 22. The generic infrastructure may be combined with any of a number of adapters in order to process commands for any of a number of different software applications at network operations center 22.

In operation, system 10 provides network operations center 22 with a managed object that describes a command. Network operations center 22 generates a request in accordance with the managed object and sends the request to system 10 through a communication network 24. A common object request broker architecture (CORBA) interface servant 30 extracts an extensible markup language (XML) request from the request. An XML adapter 32 converts the XML request to a command processing infrastructure (CPI) request formatted in a CPI format that may be processed by a command processing infrastructure 34. Command processing infrastructure 34 generates a request object in accordance with the CPI request and accesses a database 28 to generate a reply object corresponding to the request object. An XML reply is generated according to the reply object, and is sent to network operations center 22.

According to one embodiment, network operations center 22 is responsible for management of a network. Network operations center 22 may submit a request for a command comprising a noun-verb combination and one or more parameters. The noun-verb combination includes a noun value and a verb value. The noun value defines an item on which an action is performed, and a verb value defines the action to perform on the item. For example, a request to add a subscriber may include the verb value "add" and the noun value "subscriber". The parameters may be used to customize the command.

Communication network 24 coupled to network operations center 22 may comprise, for example, a public switched telephone network, a public or private data network, the Internet, a wireline or wireless network, a local, regional, or global communication network, other suitable communication links, or any combination of the preceding. It may be understood to one skilled in the art that system 10 may receive requests from any suitable communications node through any suitable network.

System 10 coupled to communication network 24 includes softswitch 20 and database 28. Softswitch 20 provides call control for establishing, maintaining, routing, and terminating voice calls, and may serve as an interface for enhanced service and application platforms. Softswitch 20 may comprise, for example, a CISCO BTS 10200 softswitch.

Softswitch 20 includes an element management system 26. Element management system 26 enables a user to plan, provision, configure, and monitor softswitch 20. A generic infrastructure of element management system 26 processes commands for data validation, data routing, and data storage. Element management system 26 includes CORBA interface servant 30, XML adapter 32, and command processing infrastructure 34. CORBA interface servant 30 provides location independent transport for XML documents such that network operations center 22 does not need to locate softswitch 20.

CORBA interface servant 30 receives a request from network operations center 22 and extracts an XML request from the request. CORBA interface servant may provide to network operations center 22 a interface definition language (IDL) that has a discrete set of functions to request command processing for any of a number of commands. The functions may include, for example, a get document function that retrieves any of a number of descriptions of commands that may be provided to network operations center 22, thus allowing a function to provide any of a number of commands. CORBA interface servant 30 is described in more detail with reference to FIG. 3.

The illustrated system 10 includes CORBA interface servant 30 that serves as a CORBA adapter. One skilled in the art, however, will recognize that any suitable adapter may be used, for example, an hypertext transport protocol (HTTP) or a Java Messaging Service (JMS) adapter.

XML adapter 32 translates between data expressed in XML documents and data expressed in a CPI format that may be processed by command processing infrastructure 34. For example, XML adapter 32 generates an extensible markup language document from a managed object expressed in CPI format. The extensible markup language document is provided to network operations center 22. XML adapter 32 may also extract a noun-verb combination and parameters from an XML request and format the noun value, verb value, and parameters into a CPI request that may be processed by command processing infrastructure 34. XML adapter 32 generates a corresponding XML document that defines the element and attribute of the command. XML adapter 32 is described in more detail with reference to FIG. 4.

Command processing infrastructure 34 comprises a generic infrastructure that provides for data validation, data routing, and data storage. Command processing infrastructure 34 builds a request object comprising a managed object from the noun value, verb value, and parameters extracted by XML adapter 32. Command processing infrastructure 34 accesses database 28 in order to generate a reply object comprising a managed object. Command processing infrastructure 34 may also validate data according to an object-oriented data parsing solution, route the data according to a defined manager for the data, and store the data in database 28. Command processing infrastructure 34 is described in more detail with reference to FIG. 4. Database 28 stores provisioning and maintenance information. Database 28 may comprise, for example, an Oracle database, and may use a database driver such as a Java database connectivity (JDBC) driver.

Softswitch 20 may comprise other or additional modules without departing from the scope of the invention. For example, the functionality of XML adapter and command processing infrastructure 34 may be combined into one module.

Figure 2:
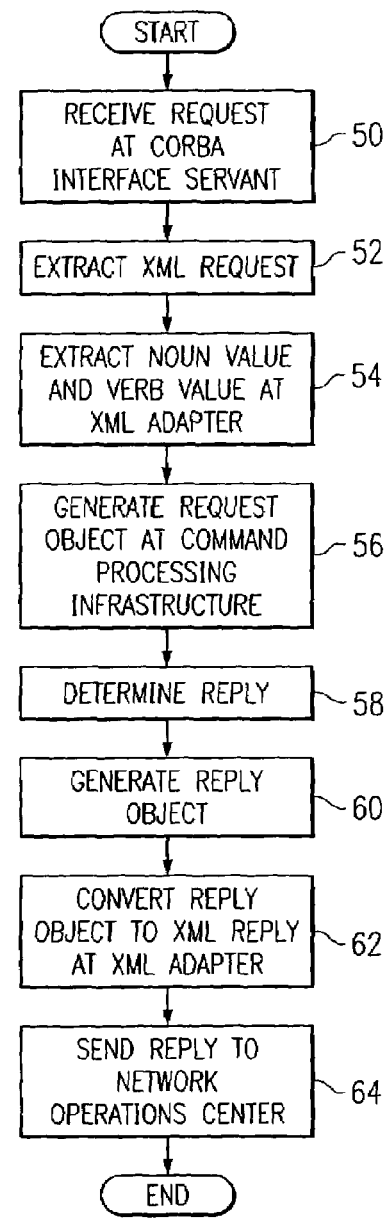
FIG. 2 is a flowchart illustrating one embodiment of a method for command processing.

FIG. 2 is a flowchart illustrating one embodiment of a method for command processing. The method begins at step 50, where CORBA interface servant 30 receives a request comprising a noun-verb combination from network operations center 22. The request may be generated according to a manage object provided to network operations center 22. CORBA interface servant 30 extracts an XML request comprising an XML document from the request at step 52, and sends the XML request to XML adapter 32. XML adapter 32 extracts the noun-verb combination from the XML request at step 54, and sends the noun value and verb value to command processing infrastructure 34.

Command processing infrastructure 34 generates a request object from the noun value and verb value at step 56. At step 58, command processing infrastructure 34 determines a reply to the request object by accessing database 28. A reply object is generated by command processing infrastructure 34 at step 60. XML adapter 32 converts the reply object to an XML reply at step 62. CORBA interface servant 30 sends the reply to network operations center 22 at step 64. After sending the reply to network operations center 22, the method terminates.

Figure 3:
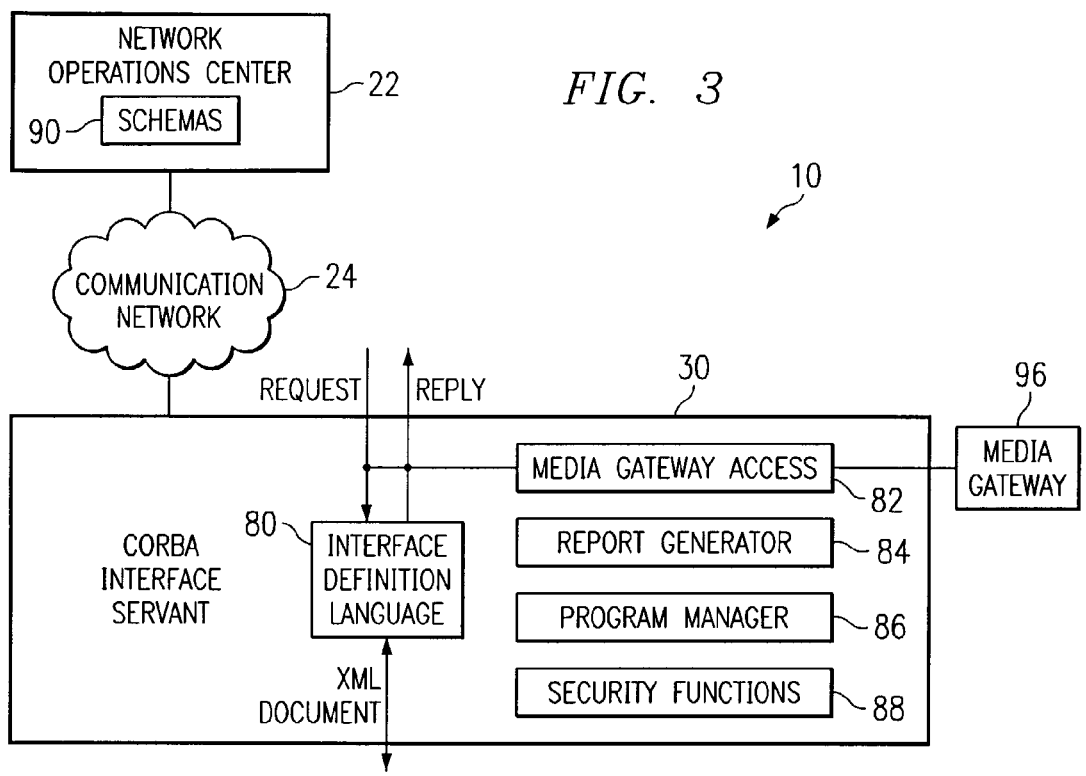
FIG. 3 is a block diagram illustrating embodiments of a network operations center and of a CORBA interface servant of the system of FIG. 1.

FIG. 3 is a block diagram illustrating embodiments of network operations center 22 and of CORBA interface servant 30 of system 10 of FIG. 1. Network operations center 22 stores schemas 90. Schemas 90 are provided for client side verification of XML document structure that may be used to submit a request or to report a reply.

Schemas 90 may include a managed object schema, a request schema, and a reply schema. A managed object schema describes a command and associated command parameters. For example, a managed object schema may describe a command to add a subscriber. A request schema is used to generate a request for a command. For example, a request schema is used to request the addition of a particular subscriber. A reply schema is used to report a reply to a request. For example, a reply schema is used to report the result of adding a particular subscriber.

A managed object schema defines a command and associated parameters. The managed object may, for example, provide information for managing the collection and validation of data at network operations center 22, dynamically building user input screens, or pre-validating user input.

A managed object schema may include an element, a managed object attribute, and other attributes comprising an identifier and a verb. The identifier represents an object on which some action is to be taken, and corresponds to the noun value of a request. The verb indicates the action to be taken on the object, and corresponds to the verb value of a request. For example, the identification may represent a subscriber and the verb may indicate adding, resulting in the managed object corresponding to adding a subscriber.

According to one embodiment, the managed object attribute may have sub-elements that describe command parameters. Sub-elements may include the following. A required sub-element indicates whether an element is required. A type sub-element defines whether the managed object attribute comprises a single value, multiple values, or text. A default sub-element defines a default value for the managed object attribute. A width sub-element defines the total field width of the data included in the managed object attribute. A help text sub-element provides a description of the managed object attribute. A label sub-element provides an alternate label to the actual parameter name. A permitted sub-element specifies possible values or ranges for the managed object attribute element.

A foreign key sub-element indicates a foreign key relationship of the managed object to another command. A parser sub-element defines the type of validation that is required. A JavaScript sub-elements indicates a JavaScript that may perform validation. A regular expression sub-element defines the regular expression of the managed object attribute in character data format.

A request schema defines the structure of a request for a command. A request schema may comprise an XML document that has one element and attributes, and may include no, one, or more entry elements. The attributes may include the noun value and verb value of the request, which may be expressed as character data.

An entry element, which may be empty, may include attributes such as key and value attributes. A key attribute comprises an identifier value derived from a managed object attribute of the associated managed object. A value attribute comprises a client-derived value assigned to a key attribute. A key attribute may be required to conform to sub-elements of the managed object attribute from which the key-value combination is derived. The key attribute and the value attribute may be expressed as character data.

A reply schema defines the structure of returned data generated in response to a request. A reply may comprise elements such as status, reason, and data table elements. A status element may have a true value or a false value. A reason element indicates successful processing or provides a cause for an error in command processing.

A data table element includes data retrieved in response to a request. A data table element may include one or more row sub-elements. A row sub-element defines an item of data, and may include an attribute that defines a row identifier. The row identifier may comprise a sequential value based on the number of returned rows. Each row may include a column sub-element that includes an identifier attribute. The identifier attribute may comprise the same identifier as used in the managed object attribute. Additional or other schemas may be used without departing from the scope of the invention.

CORBA interface servant 30 includes an interface definition language (IDL) 80, a media gateway access 82, a report generator 84, a program manager 86, and a security module 88. Interface definition language 80 allows for command processing based on a well-formed and validated XML document. Interface definition language 80 provides functions to generate XML documents that correspond to requests. Functions may include a request function and a get document function. A request function may be used to perform a command such as "add subscriber." A get document function is used to retrieve a document that may, for example, include a managed object that describes how network operations center 22 may request a command.

According to one embodiment, interface definition language 80 may provide access control. Users may be required to log into CORBA interface servant 30 utilizing a login identifier such as a login name and password in order to create a user session with CORBA interface servant 30. Authorization and authentication of the user request may be conducted during the user session.

An XML document generated by interface definition language 80 may include a standard document or an extended document. The standard document describes a command and related parameters that are available for the command, and is accessed according to the noun-verb combination of the request. The extended document includes the same information as the standard document, but also includes foreign key information. When an extended document is constructed, elements are added to account for foreign key items in the command. The extended document may also traverse nested key associations.

Media gateway access 82 allows for requests to be received from a media gateway 96. The requests received from media gateway 96 need not follow an XML format defined by an XML schema. Media gateway access 82 translates the commands to a format that may be processed by interface definition language 80. Report generator 84 generates reports that describe the activity of CORBA interface servant 30. A report may describe, for example, the number of requests for XML description documents, the number of CORBA provisioning requests, or the number of requests from media gateway 26.

A program manager 86 manages the operation of CORBA interface servant 30. Security functions 88 manages access to CORBA interface servant 30. Security functions 88 may validate user names and passwords against a security database. Security functions 88 may generate a security key once a user has been validated. The security key is required for further transactions using corporate interface servant 30. If a user is idle for longer than a specified period of time, the security key is removed, resulting in a user time out. CORBA interface servant 30 may include additional or other modules without departing from the scope of the invention.

Figure 4:
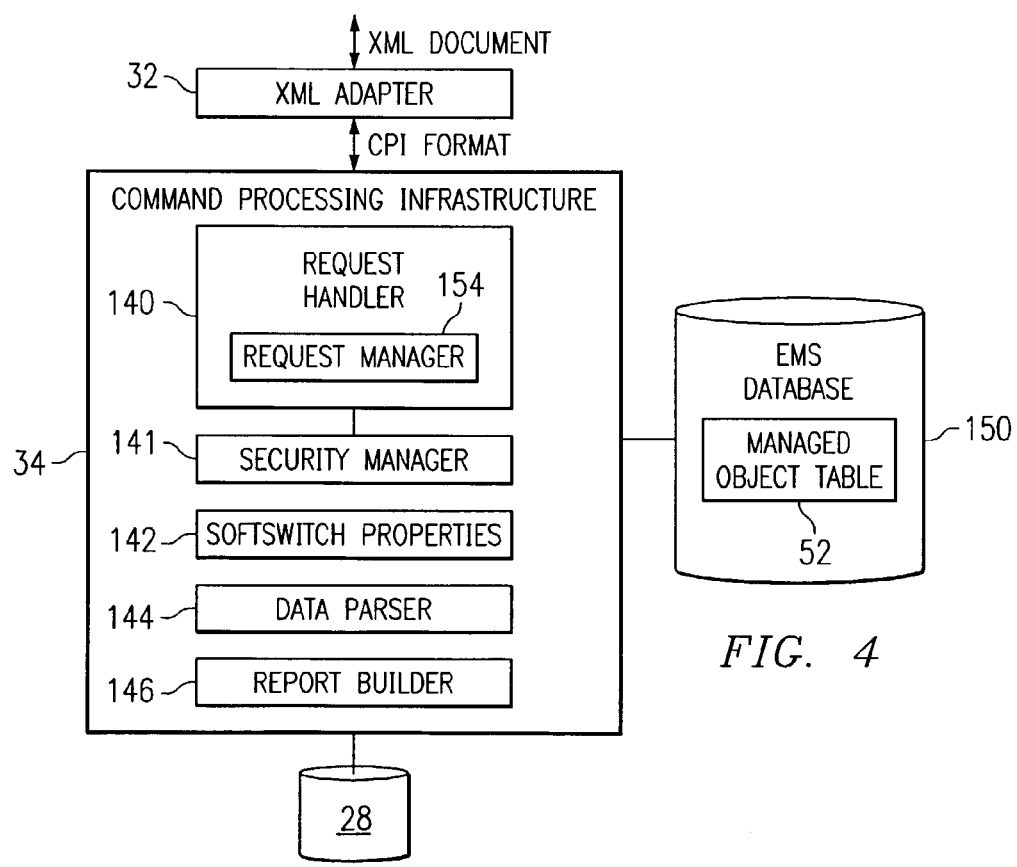
FIG. 4 is a block diagram illustrating embodiments of an XML adapter and a command processing infrastructure of the system of FIG. 1.

FIG. 4 is a block diagram illustrating embodiments of XML adapter 32 and command processing infrastructure 34 of system 10 of FIG. 1. In operation, XML adapter 32 converts an XML document into a CPI format by extracting a noun-verb combination. A request handler 140 builds a request object according to the noun-verb combination. Request handler 140 executes the request by sending the request object to an instance of a request manager 154. The instance is passed to a thread of request manager 154 for execution. A reply object is generated in response to execution of the request object.

According to one embodiment, XML adapter 32 provides an XML interface that converts XML documents into CPI formatted data and vice versa. During conversion, XML adapter 32 may extract a noun-verb combination from the XML request. XML adapter 32 may also create a hash map of parameters of the request and pass the hash map of parameters to the request object for validation.

According to one embodiment, CPI formatted data comprises Java classes that can be translated into XML document type definitions since XML supports objects and nested objects. The Java classes may include request, reply, and managed object Java classes. An XML representation of these classes form the basis for using XML for processing requests.

Command processing infrastructure 34 includes request handler 140, a security manager 141, softswitch properties 142, a data parser 144, and a report builder 146. An EMS database 150 that stores a managed object table 152 is coupled to command processing infrastructure 34. Managed object table 152 stores managed objects.

Request handler 140 builds a request object according to a noun-verb combination of a request. Alternatively, a cached request may be used. The request object includes a request data object. Request handler 140 executes the request object by sending the request object to an instance of request manager 154. The instance is passed to a thread of request manager 154 for execution. A reply object is generated in response to execution of the request object. The execution of request data object yields a reply data table, which is inserted into the reply object. The request attempt may be logged in database 26, and the entry may be updated with a reply status. Request handler 140 may also perform security checks using security module 141 and basic command integrity checks.

Request manager 154 defines the basic sub-architecture for processing a command. A command is associated with request manager 154 and optionally a database table. If a command has special rules, request manager 154 may be extended to create a class to handle the special rules. Request manager 154 services a request and sends a message to a peer process to retrieve data. Request manager 154 may also have a set of verification methods for subclasses to override rules that are not handled by the managed object or by the database 26. Request manager 154 may also define a set of standard action methods such as methods that perform additions, changes, deletions, and showing of commands that map to managed object table 152.

Security manager 141 provides security operations Softswitch properties 142 stores configurable data, and may include, for example, default values, maximum or minimum values, or required values. Data parser 144 parses input information into parts that my be processed by command processing infrastructure 34. Data parser 144 may, for example, parse numerical or character values, identifiers such as Internet domain addresses or social security numbers, or codes such as SS7 point codes. Report builder 146 generates reports describing the performance of command processing infrastructure 34.

One skilled in the art will recognize that XML adapter 32 and command processing infrastructure 32 may include fewer, other, or additional modules without departing from the scope of the invention.

Certain embodiments of the invention may provide one or more technical advantages. A technical advantage of one embodiment may include a command processing infrastructure that provides a managed object schema that describes a command. A request may use the managed object schema to formulate a request for the command. By providing the managed object schema to the requestor, the command processing infrastructure may be used with any of a number of software applications. Another technical advantage of one embodiment may include an interface servant that has an interface definition language. The interface definition language allows any of a number of systems to request a command definition.

Although an embodiment of the invention and its advantages are described in detail, a person skilled in the art could make various alterations, additions, and omissions without departing from the spirit and scope of the present invention as defined by the appended claims.

What is claimed is:

1. A method for command processing, comprising:
   providing a managed object from an element management system of a switch to a network operations center, the managed object corresponding to a command, the command associated with a noun and a verb, the noun representing an item, the verb representing an action to perform on the item, the managed object describing generation of a request for the command, the element management system operable to configure the switch;
   receiving a request for the command generated in accordance to the managed object, the request comprising an extensible markup language (XML) request, the XML request comprising a noun value corresponding to the noun, the XML request comprising a verb value corresponding to the verb;
   implementing a common object request broker architecture (CORBA) interface servant of the element management system to extract the XML request;
   extracting the noun value and the verb value from the XML request;
   generating an extensible markup language document from the noun value and the verb value;
   generating a request object from the extensible markup language document;
   determining a reply in response to the request; and
   transmitting the reply.

2. The method of claim 1, wherein providing a managed object corresponding to a command comprises:
   retrieving the managed object corresponding to the noun and the verb;
   generating an extensible markup language document comprising the managed object; and
   providing the extensible markup language document comprising the managed object.

3. The method of claim 1, wherein the request comprises one or more parameters, each parameter comprising an element key and an element value, the element key identifying an element, the element value representing a value corresponding to the element.

4. The method of claim 1, wherein determining a reply in response to the request comprises:
   executing the request object to determine a reply object; and
   generating the reply corresponding to the reply object.

5. The method of claim 1, wherein determining a reply in response to the request comprises:
   creating a request data object from the request object;
   executing the request data object to yield a reply data table; and
   inserting the reply data table into a reply object.

6. The method of claim 1, wherein the managed object is associated with a request schema and a reply schema, the request schema describing generation of the request, the reply schema describing reporting of the reply.

7. A system for command processing, comprising:
   a database operable to store a managed object corresponding to a command, the command associated with a noun and a verb, the noun representing an item, the verb representing an action to perform on the item, the managed object describing generation of a request for the command; and
   a physical switch coupled to the database, the switch comprising an element management system operable to configure the switch, the element management system operable to:
   provide the managed object to a network operations center;
   receive a request for the command generated in accordance to the managed object, the request comprising an extensible markup language (XML) request, the XML request comprising a noun value corresponding to the noun, the XML request comprising a verb value corresponding to the verb;
   implement a common object request broker architecture (CORBA) interface servant of the element management system to extract the XML request;
   extract the noun value and the verb value from the XML request;
   generate an extensible markup language document from the noun value and the verb value;
   generate a request object from the extensible markup language document;
   determine a reply in response to the request; and
   transmit the reply.

8. The system of claim 7, wherein the switch is operable to provide the managed object corresponding to the command by:
   retrieving the managed object corresponding to the noun and the verb;
   generating an extensible markup language document comprising the managed object; and
   providing the extensible markup language document comprising the managed object.

9. The system of claim 7, wherein the request comprises one or more parameters, each parameter comprising an element key and an element value, the element key identifying an element, the element value representing a value corresponding to the element.

10. The system of claim 7, wherein the switch is operable to determine a reply in response to the request by:
   executing the request object to determine a reply object; and
   generating the reply corresponding to the reply object.

11. The system of claim 7, wherein the switch is operable to determine a reply in response to the request by:
   creating a request data object from the request object;
   executing the request data object to yield a reply data table; and
   inserting the reply data table into a reply object.

12. The system of claim 7, wherein the managed object is associated with a request schema and a reply schema, the request schema describing generation of the request, the reply schema describing reporting of the reply.

13. A physical switch storing logic for command processing, the logic operable to:
   provide a managed object from an element management system of the switch to a network operations center, the managed object corresponding to a command, the command associated with a noun and a verb, the noun representing an item, the verb representing an action to perform on the item, the managed object describing generation of a request for the command, the element management system operable to configure the switch;
   receive a request for the command generated in accordance to the managed object, the request comprising an extensible markup language (XML) request, the XML request comprising a noun value corresponding to the noun, the XML request comprising a verb value corresponding to the verb;
   implement a common object request broker architecture (CORBA) interface servant of the element management system to extract the XML request;
   extract the noun value and the verb value from the XML request;
   generate an extensible markup language document from the noun value and the verb value:
   generate a request object from the extensible markup language document;
   determine a reply in response to the request; and transmit the reply.

14. The switch of claim 13, the logic operable to provide a managed object corresponding to a command by:
   retrieving the managed object corresponding to the noun and the verb;
   generating an extensible markup language document comprising the managed object; and
   providing the extensible markup language document comprising the managed object.

15. The switch of claim 13, wherein the request comprises one or more parameters, each parameter comprising an element key and an element value, the element key identifying an element, the element value representing a value corresponding to the element.

16. The switch of claim 13, the logic operable to determine a reply in response to the request by:
   executing the request object to determine a reply object; and
   generating the reply corresponding to the reply object.

17. The switch of claim 13, the logic operable to determine a reply in response to the request by:
   creating a request data object from the request object;
   executing the request data object to yield a reply data table; and
   inserting the reply data table into a reply object.

18. The switch of claim 13, wherein the managed object is associated with a request schema and a reply schema, the request schema describing generation of the request, the reply schema describing reporting of the reply.

19. A method for command processing, comprising:
   providing a managed object from an element management system of a switch to a network operations center, the managed object corresponding to a command, the command associated with a noun and a verb, the noun representing an item, the verb representing an action to perform on the item, the managed object describing generation of a request for the command, the element management system operable to configure the switch, providing a managed object corresponding to a command comprising retrieving the managed object corresponding to the noun and the verb, generating an extensible markup language document comprising the managed object, and providing the extensible markup language document comprising the managed object, the managed object associated with a request schema and a reply schema, the request schema describing generation of the request, the reply schema describing reporting of the reply;
   receiving a request for the command generated in accordance to the managed object, the request comprising an extensible markup language (XML) request, the XML request comprising a noun value corresponding to the noun, the XML request comprising a verb value corresponding to the verb, the request comprising one or more parameters, each parameter comprising an element key and an element value, the element key identifying an element, the element value representing a value corresponding to the element;
   implementing a common object request broker architecture (CORBA) interface servant of the element management system to extract the XML request;
   extracting the noun value and the verb value from the XML request, generating an extensible markup language document from the noun value and the verb value, generating a request object from the extensible markup language document, creating a request data object from the request object, executing the request data object to yield a reply data table;
   inserting the reply data table into a reply object and generating the reply corresponding to the reply object.

* * * * *